Jan. 15, 1952  C. C. CAREY  2,582,767
TRUCK CHASSIS SUPPORT
Filed July 27, 1948   2 SHEETS—SHEET 1
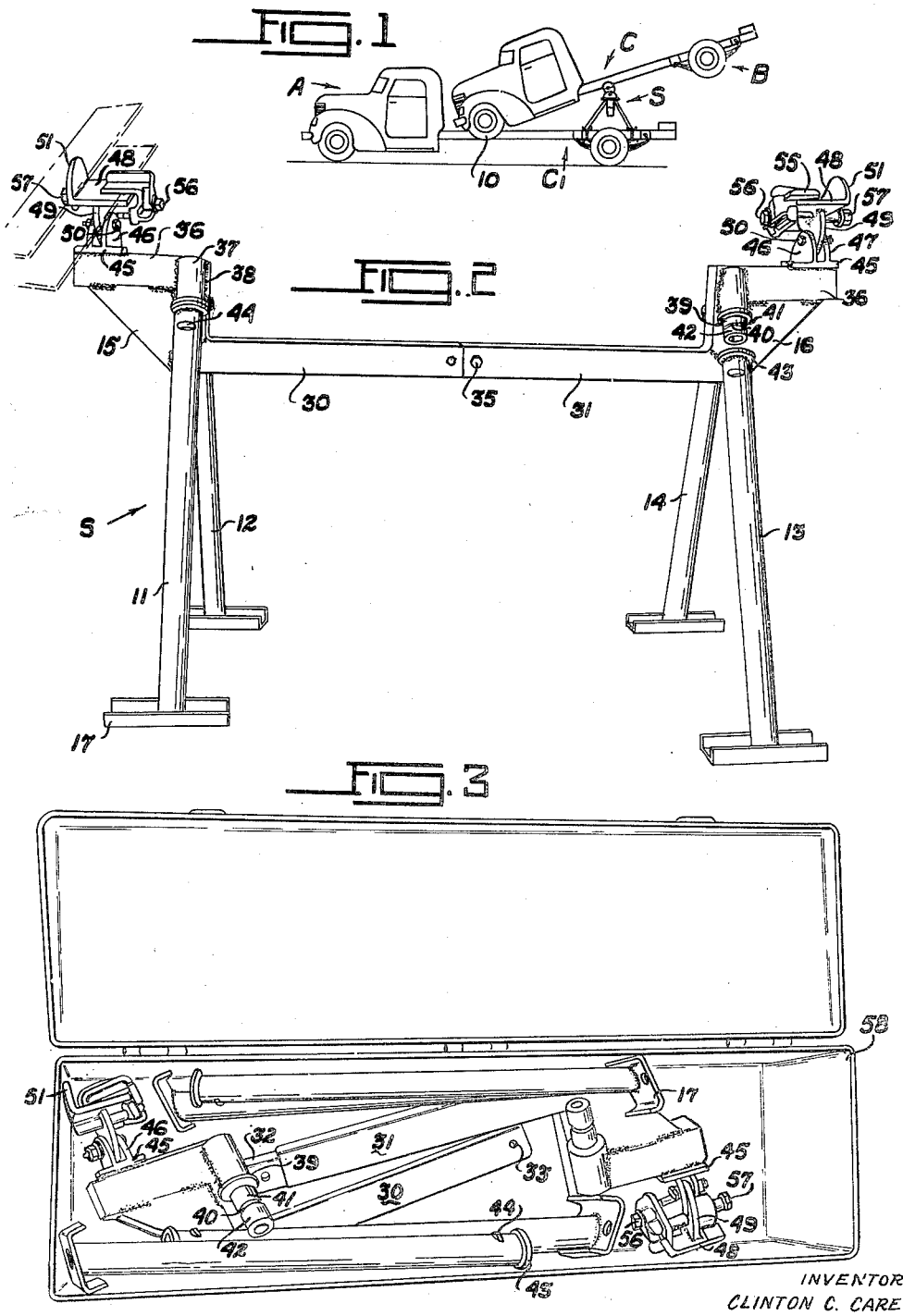
INVENTOR
CLINTON C. CAREY
By Toulmin & Toulmin
ATTORNEYS

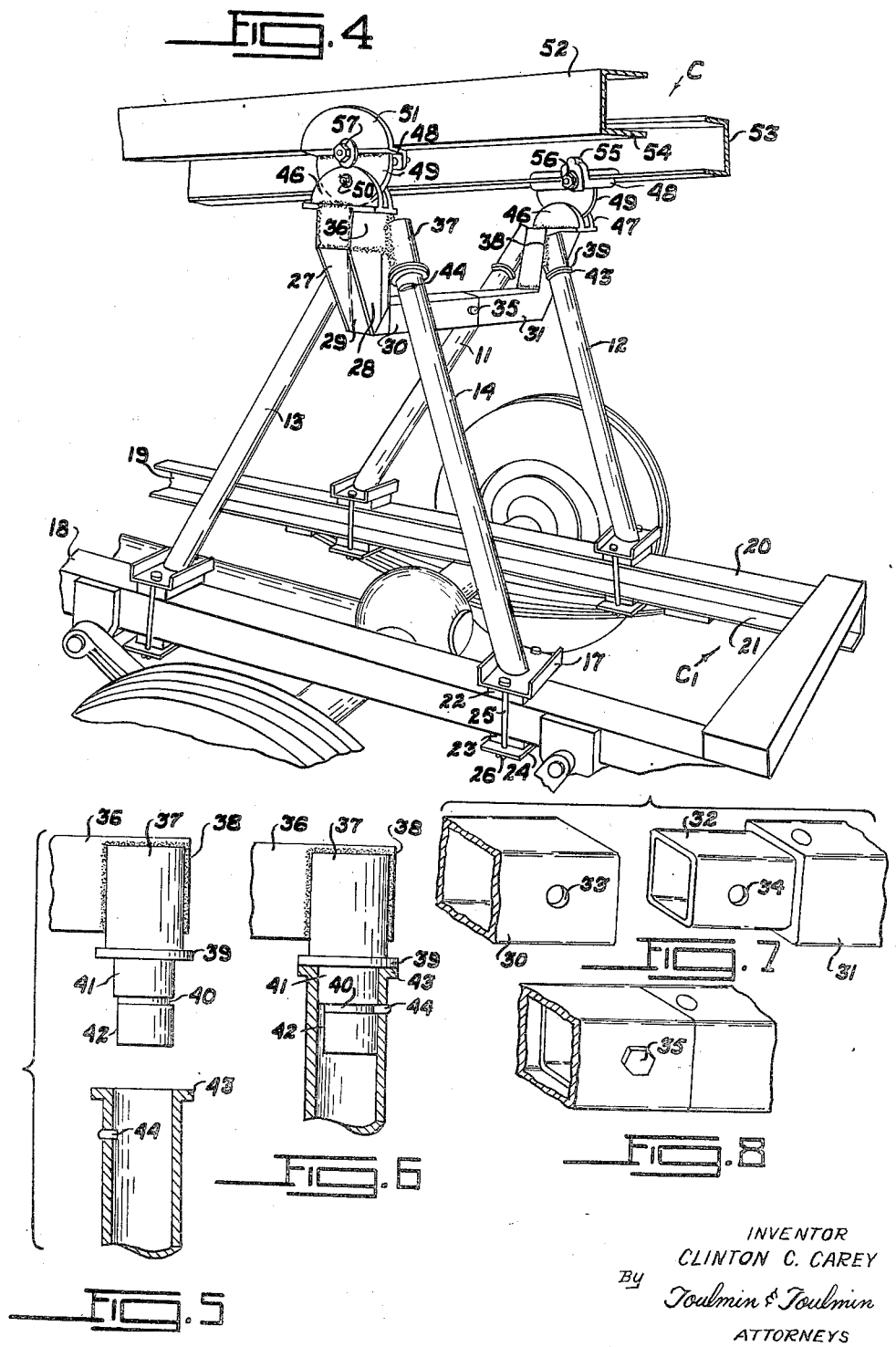

Patented Jan. 15, 1952

2,582,767

UNITED STATES PATENT OFFICE 2,582,767

TRUCK CHASSIS SUPPORT

Clinton C. Carey, Springfield, Ohio, assignor to Kenosha Auto Transport Corp., Springfield, Ohio, a corporation of Ohio Application July 27, 1948, Serial No. 40,899

4 Claims. (Cl. 296—1)

The present invention relates to the carrying of one truck by another, and is concerned primarily with a novel structural device which provides for the mounting of the carried truck on the carrier. At the present time the practice of having trucks delivered by the "Driveaway Companies" is prevalent throughout the country, and one of the systems which is widely employed is to mount one truck on another so that one driver may deliver two trucks to the point of destination.

In order to mount a truck in this manner it is necessary that its front end be anchored to the chassis of the carrier, while its rear end is anchored in an upraised position, so that the carried truck assumes a forwardly inclined position.

The present invention is concerned primarily with this structure which elevates the rear portion of the carried truck into this position.

At the present time it is common practice to employ wooden shoring for this purpose. Thus, wood shoring beams are positioned so that they extend along the chassis of the carrier truck, and then additional wood blocks are placed on the shoring beams at the proper location to support the rear axle of the carried truck.

This method presents two main objections. In the first place it is expensive in that after the trucks are delivered the wooden shoring and blocks are discarded as waste; and secondly, the carried truck is supported from its rear axle rather than its chassis, which is the more desirable situation.

With the foregoing conditions in mind the present invention has in view, as its foremost objective, the provision of a new and improved means for supporting the carried truck from its chassis and which means is of a sectional construction which is adapted for disassembly, whereby it may be returned to the point of shipment and used over and over again.

More in detail, the invention has as an object the provision of a sectional truck supporting structure that is adapted for mounting in assembled position on a truck with its feed securely anchored to the chassis thereof, and including means at its upper end for securing the same to the chassis of a truck to be carried.

In carrying out this idea a pair of converging legs are included on each side of the structure, and these legs are detachably connected at the top to a connecting member. The connecting members at each side are joined by a cross beam which is of a detachable telescopic construction. Each of these connecting members carries means for anchoring the same to a side bar of the truck chassis that is to be carried.

Under practical conditions it is necessary that the carrier truck be capable of supporting trucks having chassis of varying lengths. This means that when they are positioned on the carrier truck they will assume different angles of inclination, depending on the chassis length. Thus, it is important that the securing means carried by each of the connecting members should be capable of accommodating this change in the angle of inclination.

Accordingly, a further object of the invention is the provision of a truck mounting structure of the type indicated, which includes clamping means carried by each of the connecting members at the top, which is adjustable to accommodate variations in the angle of inclination of the chassis of the carried truck with respect to the carrier.

Various other more detailed objects and advantages of the invention, such as arise in carrying out the above noted ideas in a practical embodiment, will in part become apparent and in part be hereinafter stated as the description of the invention proceeds.

The invention, therefore, comprises a mounting of sectional construction that is adapted to be assembled on a truck chassis for supporting another chassis therefrom and which may be disassembled after delivery of the truck so that it may be returned to the point of shipment, and which structure is characterized as supporting the carried truck directly from its chassis and being capable of accommodating variations in the length thereof.

For a full and more complete understanding of the invention, reference may be had to the following description and accompanying drawings wherein:

Figure 1 is a view in side elevation and somewhat diagrammatic showing the manner in which one truck carries another in accordance with the precepts of this invention;

Figure 2 is a perspective showing the mounting of this invention in assembled position, but with one leg disassembled;

Figure 3 shows the mounting as disassembled and packed in a box for shipping purposes;

Figure 4 is an enlarged detailed perspective showing the manner in which the chassis of the carried truck is supported on the chassis of the carrier truck by the mounting of this invention;

Figure 5 is a side view, partly in elevation and partly in section, developing the upper portion of one of the legs and the complemental part of the connecting member in exploded relation;

Figure 6 is a view similar to Figure 5, but showing the parts as joined;

Figure 7 is a perspective bringing out the end portions of the sections of the telescoping cross bar in exploded relation; and Figure 8 is a perspective showing the parts of Figure 7 as joined.

Referring now to the drawings, wherein like reference characters denote corresponding parts, and first more particularly to Figure 1, a carrier truck is represented at A and is shown as being in the usual condition of having the body removed, because it is in this condition that the trucks are delivered by the "Driveaway Companies."

The truck A is shown as supporting the carried truck B from its chassis. It will be noted that the forward end of the truck B is clamped to the chassis of the truck A at a point represented at 10 by structural elements which are not a part of the present invention.

The manner in which the forward ends of the carried truck are secured to the chassis of the carrier is now conventional in this art and need not be here illustrated.

The carried truck B is shown as including a chassis referred to generally as C, which is supported from the chassis of the truck A, which is designated C1, by the mounting structure of this invention, which is identified in its entirety by the reference character S.

Referring more particularly to Figures 2 and 4, the structure S is shown as comprising four legs, 11, 12, 13 and 14. The legs 11 and 12 constitute a pair at one side of the truck and the legs 13 and 14 a pair at the opposite side. The pair 11 and 12 is connected at the top to a connecting member designated 15, while the pair 13 and 14 is connected to the top to a corresponding member 16.

It will be noted that the legs 11 and 12 converge toward the connecting member 15, just as the legs 13 and 14 converge toward the connecting member 16.

At its lower end, each of the legs 11, 12, 13 and 14 carries a foot 17 which may be anchored thereto in any preferred manner such as by welding. Each of these feet is secured to the chassis C1 in the manner now to be described.

Upon referring to Figure 4, it will be noted that the chassis C1 includes a pair of side bars 18 and 19, each of which is of a channel bar construction, providing a top flange 20 and a bottom flange 21.

A block 22, which may be of wood or other suitable material, is placed over the top flange 20 of the respective side bars, and the foot 17 rests against this block.

Another block 23 is placed against the underface of the bottom flange 21, and a retaining plate 24 placed thereagainst to hold it in position.

Tie bolts 25 pass through openings in the feet 17 and plates 24, respectively, and nuts 26 at the lower ends of these bolts are tightened to achieve a tightly clamped relation of the feet 17 with respect to the side bars of the truck chassis C1.

Each of the connecting members 15 and 16 includes a pair of spaced triangularly shaped webs 27 and 28, which are joined along their inner edges by a plate designated 29, which preferably is integrally connected thereto.

Extending outwardly from the lower end of this plate 29, to which it may be secured by welding, is a tubular section 30 which is of substantially square cross section. It will be noted that the section 30 outstands from the connecting member 15, while a corresponding tubular section 31 extends inwardly from the connecting member 16.

As shown in Figure 7 the section 31 carries a reduced extension 32 which is adapted to snugly telescope within the end of the section 30. The end portion of the latter is formed with aligned openings 33, while the reduced extension 32 is formed with aligned openings 34.

When the extension 32 is fitted within the end of the section 30 the openings 33 and 34 are aligned and a bolt 35 may be passed therethrough and anchored in the usual manner by a nut to maintain the sections assembled.

The two sections together 30 and 31 define what is, in effect, the cross bar of a horse.

It is intended that each of the legs 11, 12, 13 and 14 be detachably secured at the top to its respective connecting member 15 or 16.

Inasmuch, as each of these detachable joints will be a substantial duplicate of the other, only one of them is here described for the purposes of this specification.

The side webs 27 and 28 are connected at the top to a square shaped cross piece 36. Secured to each side of this cross piece 36 in an inclined position is a post 37. The anchor of the post 37 to the cross piece 36 may be accomplished in any preferred manner, such as by the welding represented at 38.

The post 37 is formed with a ring-like flange 39 and at a point spaced from the flange with an annular groove 40. This annular groove 40 is formed in a cylindrical portion 41 which is somewhat smaller in diameter than the main body of the post 37. From this groove 40 to the free end of the cylindrical portion there is formed a flat surface 42 for a purpose to be later described.

The upper end of each of the legs 11, 12, 13 and 14 is formed with an out-turned flange 43 that is adapted to abut the flange 39 at a point spaced from its free end. Each of these legs carries an inwardly extending projection 44, with the spacing accurately corresponding to the spacing of the groove 40 from the flange 39.

When a leg is to be assembled its angular position is adjusted so that the projection 44 corresponds to the flat 42. This permits the leg to be moved upwardly so that it receives the cylindrical portion 41 of the post 37. This upward motion is continued until the flanges 39 and 43 abut. In this position the projection 44 will be in alignment with the groove 40. The leg is now turned, whereupon the projection 44 rides into the groove 40.

Inasmuch, as each of the legs is bolted to the chassis of the truck A, after it has been turned a required distance there is no chance for this bayonet joint to become loose or disengaged.

Secured to the upper face of each of the cross pieces 36 of the connecting members 15 and 16 is a plate 45 having spaced ears 46 and 47, each of which is substantially semi-circular in formation.

A clamping member 48 carries a depending ear or disc 49 which fits between the ears 46 and 47. This ear 49 is also semi-circular in formation. The ears 46, 47 and 49 are formed with aligned openings through which pass a bolt 50.

The exact position of these openings through which the bolt 50 passes is important, because in any adjusted position it is essential that the peripheral edge of the ear 49 be in contact with the upper face of the plate 45 so that the stress of the weight on the clamp 48 will be transmitted through the ear 49 to the plate 45 rather than through the bolt 50. At least the major part of this weight should be transmitted in this manner, although it may be necessary, as a practical matter, to have a part of it transmitted through the bolt 50.

The clamp 48 includes a side flange at 51 which is adapted to engage the outer side walls of the chassis side bars of the truck C.

As shown in Figure 4, the chassis C includes side bars 52 and 53 which are of channel construction, and each of which includes a bottom flange 54.

Each flange 54 rests against one of the clamps 48 on the seat portion thereof with the side flange 51 extending over the outer surface of the respective side bar.

Each clamp 48 carries a complemental clamping element 55 which is detachably secured in position by a bolt 56, which it will be noted passes along the under surface of the clamp 48 through the ear 49 to the opposite side of the clamp where its head 57 is positioned.

This clamping element 55 is adapted to rest on the upper face of the flange 54, while the lower face of this flange rests against the clamp 48. Thus, when the bolt 57 is tightened, the lower flanges of the chassis side bars are securely gripped.

Operation

While the manner of assembling and using the above described mounting structure is believed to be evident from the description already given, it may be briefly outlined by noting that the legs are first assembled on the connecting members 15 and 16 and the cross bar sections 30 and 31 joined to achieve the condition which is depicted in Figure 2.

The feet 17 are now anchored to the chassis C1 of the truck A in the manner shown in Figure 4, and in this position any rotation of the legs relative to their connecting members is inhibited. Thus, there is definite assurance that so long as the structure remains in the mounted position the legs will remain assembled on their connecting members.

The clamping elements 55 are now removed, whereupon the truck B is lowered into position so that the flanges 54 of the side bars 52 and 53 rest against the upper surfaces of the clamps 48.

The clamping elements 55 are now positioned and the bolts 57 tightened to achieve a securely clamped relation.

The forward end of the truck B will be anchored at the point 10 and the trucks A and B are in condition for delivery.

After they have reached their point of destination the clamping elements 55 are removed, whereupon the connection at 10 is broken to permit the truck B to be lifted off the truck A.

The structure S is now disassembled by reversing the operation above described, after which the various parts may be packed in the box shown in Figure 3 and designated 58. It is evident that the parts are packed in a compact formation and the box may be shipped back to the point of shipment for reuse.

While a preferred specific embodiment of the invention is hereinbefore set forth, it is to be clearly understood that the invention is not to be limited to the exact constructions, mechanisms and devices illustrated and described, because various modifications of these details may be provided in putting the invention into practice within the purview of the appended claims.

What is claimed is:

1. In a mounting structure of the character described, a pair of opposed connecting members each comprising spaced webs, a cross piece and an inner plate, all integrally joined together; a clamping member supported on each said cross piece; a sectional cross bar having opposing ends thereof each integrally joined to one said plate; means for establishing a pivotal connection with said clamp carried by said cross piece, and means detachably securing a pair of downwardly diverging legs to each said connecting member.

2. In a mounting structure of the character described, a pair of spaced connecting members each adapted with a pair of upwardly converging detachable legs, a tubular member attached to each connecting member adapted to interlock forming a cross bar extending transversely between said pairs of legs, plates secured to the top of said connecting members, spaced companion ears carried by said plates, a clamp adapted to be secured to the chassis of a truck to be carried mounted with a semi-circular ear depending from the clamp base and positioned between said companion ears, and a bolt passing through aligned openings in said ears establishing a pivotal connection therebetween.

3. In a mounting structure of the character described, a pair of spaced connecting members, a pair of upwardly converging detachable legs adapted to be secured to each of said connecting members and to the chassis of a carrier truck, a sectional cross bar extending transversely to and joining said connecting members and comprising a detachable telescopic joint between the sections of said cross bar, a clamping member supported on each said connecting member and adapted to be secured about the side bars of a chassis of a supported truck, an ear depending from the base of said clamping member and having an arcuate peripheral edge, a plate on each connecting member normally engaged by said arcuate edge, parallel spaced ears mounted on said plate adjacent the point of contact of said arcuate edge, and a pivotal connection between all of said ears.

4. A clamp for the the securing of a side bar of a truck chassis, said side bar being of a channel construction having a back portion and upper and lower parallel walls extending therefrom, comprising a base member having an aperture therethrough, a seat member secured on the upper surface of said base member, a flange extending upwardly from said seat member on an edge thereof for engagement with the back of said side bar on the inner side of the said flange, a substantially C-shaped assembly comprising a bolt member passing through said aperture of said base member beneath said seat member and substantially parallel thereto, a holding means on one end of said bolt member for engagement with the outer side of said flange, a body member secured on the other end of said bolt member and extending substantially parallel to said flange, and a clamping member extending substantially perpendicularly from said body member and over said seat member for clamping a said wall of said side bar therebetween.

CLINTON C. CAREY.

REFERENCES CITED

The following references are of record in the file of this patent:

UNITED STATES PATENTS

| Number | Name | Date |
| --- | --- | --- |
| 260,068 | Van Kirk | June 27, 1882 |
| 337,474 | Bartlett | Mar. 9, 1886 |
| 828,290 | Hutchins | Aug. 7, 1906 |
| 937,612 | Kircher | Oct. 19, 1909 |
| 1,469,734 | Staley | Oct. 2, 1923 |
| 1,965,525 | Roscher et al. | July 3, 1934 |
| 2,082,139 | Bossetti | June 1, 1937 |
| 2,471,521 | Galey | May 31, 1949 |